United States Patent [19]

Pithouse et al.

[11] 4,392,898

[45] Jul. 12, 1983

[54] DEVICE FOR ENCLOSING OBJECTS

[75] Inventors: Kenneth B. Pithouse, Swindon, England; Christopher J. Swinmurn, Cupertino, Calif.

[73] Assignee: Raychem Limited, London, England

[21] Appl. No.: 364,086

[22] Filed: Mar. 31, 1982

Related U.S. Application Data

[63] Continuation of Ser. No. 259,286, Apr. 30, 1981, abandoned.

[30] Foreign Application Priority Data

May 3, 1980 [GB] United Kingdom ................. 8014923
Sep. 13, 1980 [GB] United Kingdom ................. 8029663

[51] Int. Cl.³ .................... B29C 27/00; B32B 31/00; A61F 13/02; H02G 13/06
[52] U.S. Cl. ......................................... 156/85; 156/86; 174/84 R; 174/DIG. 8; 428/40; 428/41
[58] Field of Search ............... 174/DIG. 8, 84 R; 156/84, 85, 86; 428/40, 41

[56] References Cited

U.S. PATENT DOCUMENTS

| 2,027,962 | 1/1936 | Currie | 174/DIG. 8 |
|---|---|---|---|
| 2,717,885 | 9/1955 | Greenlee | 528/91 |
| 2,962,453 | 11/1960 | Phillips et al. | 528/408 |
| 3,018,258 | 1/1962 | Meier et al. | 528/106 |
| 3,397,156 | 8/1968 | Lopez et al. | 528/93 |
| 3,574,313 | 4/1971 | Tanaka | 174/DIG. 8 |
| 3,677,978 | 7/1972 | Dowbenko et al. | 528/94 |
| 3,678,007 | 7/1972 | Dowbenko et al. | 528/92 |
| 3,770,556 | 11/1973 | Evans et al. | 174/DIG. 8 |
| 3,878,843 | 4/1975 | Morgan | 428/41 |
| 3,956,241 | 5/1976 | Steele et al. | 528/92 |
| 3,957,382 | 5/1976 | Gruel et al. | |
| 4,070,746 | 1/1978 | Evans et al. | 174/DIG. 8 |
| 4,079,554 | 3/1978 | Terwilliger | 428/40 |
| 4,200,676 | 4/1980 | Caponigro et al. | 174/DIG. 8 |
| 4,233,731 | 11/1980 | Glabburn et al. | 174/84 R |
| 4,323,607 | 4/1982 | Nishimura et al. | 156/84 |
| 4,332,849 | 6/1982 | Barkus et al. | 174/DIG. 8 |

FOREIGN PATENT DOCUMENTS

| 1116879 | 6/1968 | United Kingdom . |
|---|---|---|
| 1502574 | 3/1978 | United Kingdom . |
| 1534767 | 12/1978 | United Kingdom . |
| 2019112 | 10/1979 | United Kingdom . |

Primary Examiner—William R. Dixon, Jr.
Attorney, Agent, or Firm—Douglas A. Chaikin; Herbert G. Burkard

[57] ABSTRACT

A device for enclosing at least part of an elongate object, for example a pipe line, comprises a dimensionally recoverable cover 21 one surface of which is partly or wholly coated with a closure adhesive 22 and covered by a layer of sealant.

The cover is preferably in the form of a continuous sheet which may be cut to the appropriate length. The device may be wrapped around the object and the overlying sealant may then be peeled back or peeled away to expose the closure adhesive. The cover is bonded to itself or to the object to be enclosed by means of the exposed closure adhesive, and the device is then recovered by heating.

22 Claims, 7 Drawing Figures

DEVICE FOR ENCLOSING OBJECTS

This is a continuation of application Ser. No. 259,286, filed Apr. 30, 1981, abandoned.

This invention relates to closure devices for enclosing objects, especially elongate objects such as pipes and cables.

The present invention provides a device for enclosing at least part of an object, which comprises a dimensionally recoverable cover having a surface that is at least partly coated with an adhesive for retaining the cover in position during recovery of the cover (closure adhesive), and at least partly coated with a sealant which prevents the adhesive adhering to an article but which can be separated from the cover and/or adhesive, and preferably manually separated to allow the adhesive to adhere to an article.

As stated above, the cover of the device is dimensionally recoverable. Dimensionally recoverable articles are articles, the dimensional configuration of which may be made substantially to change by the appropriate treatment. Thus, for example, the cover may comprise an elastomeric material which is bonded to a layer of material that holds the elastomeric material in an extended configuration, and which will contract when the bond is broken. Examples of such articles are disclosed in U.S. Pat. No. 4,070,746 and U.K. Specification No. 2,018,527A, the disclosures of which are incorporated herein by reference. Preferably the cover is dimensionally heat-recoverable, that is, the cover has a dimensional configuration which may be made substantially to change when subjected to heat treatment. Heat-recoverable articles may be produced by deforming a dimensionally heat stable configuration to a dimensionally heat unstable configuration, in which case the article will assume, or tend to assume, the original heat stable configuration on the application of heat alone.

According to one method of producing a heat recoverable article, a polymeric material is first extruded or moulded into a desired shape. The polymeric material is then cross-linked or given the properties of a cross-linked material by means of chemical cross-linking initiators or by exposure to high energy radiation for example a high energy electron beam or gamma radiation. The cross-linked polymeric material is heated and deformed, and then locked in the deformed condition by quenching or other suitable cooling means. The deformed material will retain its shape almost indefinitely until exposed to a temperature above its softening or crystalline melting temperature, for example about 120° C. in the case of polyethylene. Examples of heat-recoverable articles may be found in U.S. Pat. No. 2,027,962 and in U.K. Patent Specification No. 990,235, the disclosures of which are incorporated herein by reference. As is made clear in U.S. Pat No. 2,027,962, however, the original dimensionally heat-stable configuration may be a transient form in a continuous process in which, for example an extruded tube is expanded, whilst hot, to a dimensionally heat unstable form.

The sealant may be any material that fills voids and/or provides an environmental seal between the cover and the object whether or not it adheres the cover to the object. The sealant is advantageously a hot-melt adhesive or a mastic, the term "mastic" as used herein including, amongst others, viscid, water-resistant macro-molecular compositions which exhibit both viscous and elastic response to stress. Mastics will generally have a cohesive strength of about the same order as their adhesive strength and are suitable for filling voids and interstices, at least at the temperature of installation, and to provide a seal against contaminants such as moisture, dust, solvents and other fluids. They are usually monotonic, i.e. they do not undergo any significantly abrupt decrease of viscosity on heating in some cases up to, for example, 300° C. In general they will exhibit (as described in ASTM 1146) at least second order cohesive blocking (and, preferably, second order adhesive blocking to metal substrates) at a temperature between room temperature and the glass transition temperature of the composition. They are preferably tacky at room temperature, i.e. they are capable of forming an adhesive bond of measurable strength immediately after the adhesive and the metal substrate are brought into contact under low pressure (cf. I Skeist, Handbook of Adhesives, Reinhold Publishing Co. (1962)).

The sealant may be arranged in a number of ways so that it prevents the adhesive adhering to a surface. The sealant may, for example, be located in regions adjacent to the adhesive and have a thickness greater than that of the adhesive so that the thickness of the sealant prevents the areas of adhesive contacting an article. Preferably, however, the adhesive is covered by the sealant so that a portion of the sealant can be completely or partially separated therefrom, e.g. peeled off, or peeled back, to expose an area of adhesive.

If the sealant is a hot-melt adhesive, it is possible for a portion of it to be removed simply by peeling it away from the surface of the cover or underlying adhesive. The device is preferably arranged so that any of a number of portions of the hot-melt adhesive may be removed to expose an area of the underlying adhesive.

The portions of hot-melt adhesive may be separate from each other or they may be joined together to form a single lamina of adhesive that is severable into separate portions. In a preferred embodiment, the surface of the cover is coated with one or more areas of adhesive, all of which are covered by a single layer of hot-melt adhesive in the form of a lamina that can be severed into a number of portions. The lamina is preferably arranged so that it can be severed while a portion of it is being peeled off, for example by providing the lamina with lines of weakness such as score lines or lines of perforations.

The interface between the closure adhesive and the sealant preferably has a peel stength of not more than 5 N/25 mm especially not more than 2 N/25 mm and most especially it is substantially zero.

With some combinations of sealant and closure adhesive there may be a tendency for the adhesive to adhere to the sealant rather than to the cover and so may be removed from the cover when a portion of the sealant is peeled off. This can easily be prevented in a number of ways, for example by interposing a release material, between the closure adhesive and sealant, or in the case of a sealant comprising a hot-melt adhesive, by forming the hot-melt adhesive with one irregular surface so that some parts of the hot-melt adhesive overlying the closure adhesive do not contact the adhesive with sufficient pressure to adhere to it, while other parts of the hot-melt adhesive are in close contact with the closure adhesive.

The release material may, advantageously, take the form of a peelable release layer that may be made, for example, from polytetrafluoroethylene or from a thermoplastic polymer. If the sealant is a mastic, the release material is most preferably in the form of a release layer because the mastic may then be removed to expose the adhesive by peeling back the release layer.

The device according to the invention may in general have any desired configuration and may be formed by any convenient method, preferably by extrusion. Thus, for example, if the device is intended to protect a repair or joint in an electrical cable, the cover may be in the form of a tube having a slit extending axially from one end to the other for allowing it to be installed. The inner surface of the cover is coated with the adhesive in a region extending along one edge of the slit and is also coated with a layer of the sealant, preferably over the entire inner surface. The area of sealant lying over the closure adhesive can be located on a release layer, or, if it is a hot-melt adhesive, be defined by a line of weakness (and optionally also be located on a release layer) so that, during installation, the sealant lying over the adhesive can be peeled off while leaving the remaining area of sealant in place. The region of the cover with exposed adhesive can then be placed over the corresponding region on the opposite side of the slit so that the two regions overlap and are pressed into contact. The cover may then be recovered, for example it may be heated, to soften or melt the sealant and recover the cover about the object, thereby forming a permanent enclosure.

According to a preferred aspect of the invention the device is in the form of a strip, preferably a continuous strip which may be used to form a number of enclosures.

Where the device is in the form of a strip, one surface of the strip can be coated with one or more longitudinally or transversely extending lines of adhesive or, preferably, the surface may be coated completely with adhesive, and is then provided with a sheet of hot melt adhesive which preferably also covers the entire surface. Advantageously the hot-melt adhesive is provided with lines of weakness extending across the strip and dividing the hot-melt adhesive into portions that can be peeled off the strip.

A length of the strip can be cut off and a portion of the hot-melt adhesive peeled off to expose an area of the underlying adhesive at one or each end. When the length of strip is positioned about an object to be enclosed, the exposed adhesive will retain the strip in position so that it can be heated to recover the strip about the object and to melt the hot-melt adhesive. Preferably the length of the strip that is cut off will be greater than the circumference of the object to be enclosed so that one end of the strip overlies the other end to form a lap joint. In this case only the hot-melt adhesive at the overlying end of the strip need be peeled off.

The underlying adhesive may cover the entire surface (and be covered by a release material which may be located in discrete areas on the adhesive or which may cover the entire adhesive) or be located in separate areas, preferably in a number of transversely extending areas each being covered with a release layer. In order to cover an object, a length of the strip can be cut off, preferably so that area of adhesive is located at one end of the length of the strip. The length of the strip can then be wrapped around the object so that the end with the area of adhesive will overlie the other end of the strip. The sealant can then be peeled away, for example by means of the release layer, to expose the adhesive and the two ends be pressed together. When the strip is in position it can be heated so that the strip will recover about the object and the sealant will soften and ensure that any voids between the strip and object are filled. Where the adhesive is present in transversely extending areas it may be advantageous to provide further areas of adhesive on the opposite side of the strip, each further area being located in the region of each area of underlying adhesive but displaced therefrom by an extent such that it is possible to cut a length off the strip so that an area of underlying adhesive is adjacent to one end of the length and a further area of adhesive is adjacent to the other end of the length of the strip. When the length of the strip is positioned around the object so that one end of the strip overlies the other end, the two areas of adhesive will be brought into contact. This is especially preferred if the adhesive is a contact adhesive.

Any polymeric material to which the property of dimensional recoverability may be imparted, may be used to form the cover. Preferably the cover comprises a polymeric material to which the property of dimensional recoverability has been imparted by crosslinking and deforming the material. Polymers which may be used to form the polymeric material include polyolefins such as polyethylene and ethylene copolymers for example with propylene, butene, vinyl acetate or ethyl acrylate, polyamides, polyurethanes, polyvinylchloride, polyvinylidene fluoride, elastomeric materials such as those described in U.K. Specification No. 1,010,064 and blends such as those disclosed in U.K. Specification Nos. 1,284,082 and 1,294,665, the disclosures of which are incorporated herein by reference. The present invention is of particular importance where the cover is formed from a polyolefin or a blend of polyolefins, and especially where the polymeric material comprises polyethylene.

In general, any hot-melt adhesive may be employed as the sealant provided that it will be molten or soft at the recovery temperature of the heat-recoverable material (usually about 120° C.). Examples of hot-melt adhesives that may be used include those based on polyamides, vinyl and acrylic homo- and copolymers, such as ethylene-vinyl acetate and ethylene-ethyl acrylate copolymers, polyesters and polyolefins. If the sealant is in direct contact with the cover, care should be taken to match the type of adhesive with the cover material used so that adequate bonding between the two is obtained. Thus, for example, when a polyolefin is used as the cover material, an ethylenevinyl acetate adhesive is suitable. Similarly, where the material for the cover is based on a segmented polyester, for example, as commercially available under the trade name "Hytrel" from DuPont, a polyester hot-melt adhesive is preferred.

Mastics that are suitable for use in the present invention include those based on elastomers, for example those based on natural rubbers, synthetic rubbers such as acrylic rubbers, chlorosulphonated polyethylene, epichlorohydrin rubbers, ethylene-propylene copolymers, ethylene-propylene diene terpolymers, fluoroelastomers, isobutylene-isoprene rubbers, isoprene-acrylonitrile rubbers, nitrile rubbers, polybutadiene rubbers, polychloroprene rubbers, polyiso-butylene rubbers, styrene-isoprene rubbers, urethane rubbers and thermoplastic elastomers such as polyester rubbers, ethylene-vinyl acetate elastomers, ethylene-acrylic elastomers and the A-B-A styrene-polyolefin block copolymers e.g. styrene-butadiene or styrene isoprene thermoplastic elastomers. Preferred elastomers include polyisobutylenes, ethylene-propylene terpolymers and modified butyl rubbers and the thermoplastic elastomers mentioned above.

The mastics preferably contain one or more plasticisers for example polybutenes or low molecular weight polyisobutylenes, pitch or bitumen products, one or more tackifiers and/or one or more crystalline reinforcing agents. Suitable elastomers and tackifiers are mentioned in U.K. Patent Specification No. 2,023,021A, the disclosure of which is incorporated herein by reference.

The crystalline reinforcing agents that may be used include acid terpolymers e.g. terpolymers of ethylene, vinyl acetate and methacrylic acid, waxes and low density polyethylene; preferably acid terpolymers.

Minor quantities of other additives may also be present such as fillers, antioxidants, ultraviolet stabilizers, corrosion inhibitors and colouring agents. Preferably the sealant contains carbon black, especially in a quantity of not more than 35% by weight. Where the sealant contains one or more corrosion inhibitors, soluble inorganic passivating inhibitors are preferably used such as those described in U.K. Patent Specification No. 2,023,021A.

Any adhesive that will withstand the recovery forces of the cover may be used for retaining the cover in position. The absolute values for the adhesive strength will depend on the nature and dimensions of the device, but adhesives having a lap shear strength of 150° C. of at least 70, preferably at least 200 and especially at least 700 kgf.m$^{-2}$ and a peel strength at 150° C. of at least 90 kgf.$^{-1}$ are preferred. The lap shear strength may be determined in accordance with ASTM D-1002 (using the cover material as the substrates and having the adhesive thickness equal to the thickness intended to be used in the device), and the peel strength may be determined in accordance with Raychem test specification No. RK4012). As will be appreciated, where the sealant is activated by heat, care should be taken that the adhesive forming the closure becomes effective, for example, the melting point of a hot-melt sealant. In most cases, however, this temperature will be below the recovery temperature of the cover. Preferably the adhesive is a pressure sensitive adhesive, a curable adhesive (or one that is both pressure sensitive and curable), a heat-activatable adhesive, a hot-melt adhesive that has been crosslinked or a contact adhesive.

As the pressure-sensitive adhesive, there may be mentioned rubber based acrylics or thermoplastics, styrene-butadiene or styrene-isoprene block copolymers that contain tackifiers, for example hydrocarbon tackifiers, silicones and adhesives based on ethylene-vinyl acetate, preferably styrene-butadiene block copolymers. The adhesives may be applied onto the cover from solution or from melt, in known manner.

Examples of suitable crosslinked hot-melt adhesives are given in U.S. Pat. No. 4,200,676, the disclosure of which is incorporated herein by reference. Preferably the adhesive has been crosslinked by irradiation, e.g. high energy electron or gamma irradiation, especially to the order of 10 Mrads.

Heat-curable adhesives used as the closure adhesive in the article according to the invention preferably have a cure rate such that the gel time at 150° C., is not more than ten minutes, preferably not more than five minutes and especially not more than 2 minutes. Adhesives having a gel time at 25° C. that is not less than 200 hours, preferably not less than 500 hours, and especially not less than 2000 hours are most preferred. The gel time of the adhesive is defined as the time taken for the torque value to increase to three times the initial value using a Monsanto Rheometer 100 oscillating disc rheometer.

The adhesive may be a heat-curable silicone, polyester polyurethane or epoxy adhesive, for example in which the curing agent is rendered latent by microencapsulation.

The curing agent of the adhesive may be rendered latent in known manner, for example by chemical means such as forming lewis acid (especially boron trifluoride) addition salts, quaternary ammonium salts, or by forming a complex of the curing agent with a transition metal or a b-metal, or by physical means such as retaining the curing agent in a different phase from the rest of the adhesive. Examples of latent curing systems are described in U.S. Pat. Nos. 2,717,885, 2,962,453, 3,018,258, 3,397,156, 3,677,978, 3,678,007, and 3,956,241 and in German Offenlegungsschrift No. 1,904,641, the disclosures of which are incorporated herein be reference.

The adhesive is advantageously reinforced so that it will withstand any shear forces that may act on it when it is heated, for example at about 150° C. but before it has fully cured. The adhesive may be reinforced by incorporating up to 150% by weight, preferably not more than 70% (based on the weight of the unreinforced adhesive) of a reinforcing filler, e.g. silica, or a natural or synthetic elastomer which is preferably crosslinked, e.g. a nitrile, acrylic or polyisobutylene rubber or a polyglycol ether-polyester elastomer. Alternatively, the adhesive may be reinforced by partially crosslinking it, for example, by irradiation (e.g. with high energy electrons) preferably to a level of up to 50 Mrad and especially to a level of from 5 to 10 Mrad, or, in the case of epoxy adhesives, by pre-reaction of some of the oxirane rings. The adhesive may be reinforced both by partial crosslinking and by incorporating a reinforcing filler (preferably an elastomer) prior to crosslinking. In addition to, or instead of, the above methods, the adhesive may be reinforced by providing it with mechanical reinforcing means, for example by incorporating a perforated reinforcing sheet, a fibre mat or cloth or a foam or sponge therein e.g. a glass fibre mat or cloth or an acrylic foam or sponge.

If one or more layers of release material are present in the device, they are preferably formed from a thermoplastic polymer that will melt or soften at a temperature that will be reached during installation of the device. The use of a thermoplastic polymer has the advantage that if any release layers are left in place, which may be the case where objects of large diameter are enclosed, any distinct interface between the release layer and the mastic, and preferably also between the release layer and the adhesive will disappear. As will be appreciated, any such distinct interface could, under certain conditions, provide a path for water to pass along the device underneath the cover and cause corrosion of the object. In some instances it may be desirable to use an oriented release layer that will shrink at the recovery temperature of the cover.

As thermoplastic release layers that may be used, there may be mentioned layers formed from siliconised polyethylene, siliconised ethylene-vinyl acetate, polyamides and microacrystalline waxes.

In certain cases it may be advantageous to provide the device with means that will give a visual indication that the device has reached a sufficiently high temperature for example to melt the hot-melt adhesive or to cure any latent curing adhesive. The means for indicating temperature may, for example, comprise a coat of a thermochromic indicator for example a paint as described in U.K. Patent Specification No. 1,511,053 or in German Offenlegungsschrift No. 2951921, the disclosures of which are incorporated herein by reference.

The device according to the invention has the advantage that it is possible to form an enclosure on an elongate object such as a pipe or cable which is permanently secured in position without the necessity of any mechanical fastening devices which render the device difficult to install and bulky when installed. In addition, when the closure device according to the invention is in the form of a strip it is possible to use a single strip for enclosing a number of objects of different sizes.

The closure device may be manufactured by forming a cover in a desired configuration from a polymeric material, rendering the cover dimensionally recoverable, for example by crosslinking the polymeric material and deforming the crosslinked material, and applying to one surface thereof an adhesive and a sealant so that the sealant prevents the adhesive adhering to a surface.

The cover is advantageously formed by extrusion, either in the form of a flat sheet or as a tube which is subsequently slit. It may be deformed when it is in the form of a sheet either by transverse stretching, for example on a flat bed stretcher, or, preferably by longitudinal stretching, it may be deformed as a tube, prior to slitting, either radially by application of increased gas pressure inside the tube when hot, or longitudinally.

The adhesive for retaining the device during recovery may be applied to a surface of the sheet in known manner. If for example, a pressure-sensitive is used, some or all of which is covered by a hot-melt adhesive, one or more sheets of the hot-melt adhesive of the correct size may simply be pressed into contact with the pressure-sensitive adhesive. This has the advantage that the processing of the hot-melt adhesive can be performed at a different time and/or in a different location to that of the manufacture of the closure device.

If the adhesive is to be covered by a mastic, the adhesive can be applied to the surface either as a continuous sheet or as discrete strips by means of a roller. Preferably the release layer for the mastic is in contact with the adhesive during application of the adhesive, in which case the release layer can be used to prevent the adhesive adhering to the roller, and the mastic may then be applied to the surface as a continuous layer.

The present invention also provides a method of enclosing at least part of an object by means of a device comprising a dimensionally-recoverable cover having a surface that is at least partly coated with an adhesive for retaining the cover in position during recovery of the cover and at least partly coated with a sealant that prevents the adhesive adhering to an article, which comprises the steps of:

(a) positioning the cover about the object so that one portion of the cover can overlie another part thereof;
(b) peeling a portion of the sealant from the said portion of the cover and/or adhesive to allow the adhesive to adhere to a surface;
(c) causing the said portion to overlie the other part of the cover so that the portion is bonded thereto by the adhesive; and
(d) heating the cover to cause recovery thereof.

Several closure devices according to the present invention will now be described, by way of example, with reference to the accompanying drawings, in which.

Figure 1:
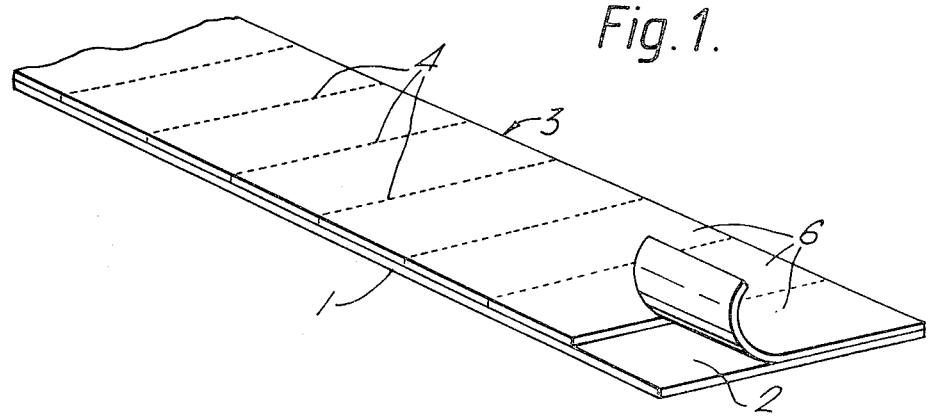
FIG. 1 is an isometric view of one device in the form of a continuous strip.

Referring to FIG. 1 of the accompanying drawings, a strip 1 having a thickness of about 2 mm and formed from a material comprising polyethylene is extruded as a sheet and irradiated with from 5 to 10 Mrads of 6 MeV electrons to crosslink the polyethylene. The strip is then heated stretched in the longitudinal direction with a stretch ratio of about 1.5:1 and quenched so that it remains in its stretched state.

The strip 1 is then solvent coated with a layer of pressure-sensitive adhesive 2 on one surface, and a strip 3 of hot-melt adhesive having a thickness of about 1 mm and the same width as that of the strip 1 is positioned over the pressure-sensitive adhesive and pressed firmly into contact therewith. The strip 3 of hot-melt adhesive is provided with a number of lines of weakness 4, for example score lines or lines of perforations, which divide the strip into a number of portions 6. A single portion 6 can be manually removed by peeling back the portion, as shown in the drawing, while applying a slight pressure to the adjacent portion to retain it in contact with the pressure-sensitive adhesive.

In order to enclose part of an elongate object, a length of the strip is cut from the remainder of the strip so that, when it is wrapped around the object one end of the strip will overlie the other end by about 5 to 10 cm. A portion 6 of hot-melt adhesive is then peeled off each end of the strip and the strip is then positioned about the object. After applying a slight pressure to each end of the strip to ensure that the pressure-sensitive adhesive 1 adheres to the object or the underlying part of the strip, the strip is heated by means of a gas torch or a hot-air gun so that the strip 1 attempts to recover thereby bringing it into close conformity with the contours of the object, and so that the hot-melt adhesive melts to form a permanent bond to the object on cooling. In some cases it may be necessary to apply a slight pressure to the overlying end of the strip at intervals during heating in order to prevent a tendency of it to peel off the underlying portion due to the fact that the outer surface of the overlying end will begin to recover before its inner surface.

Figure 2:
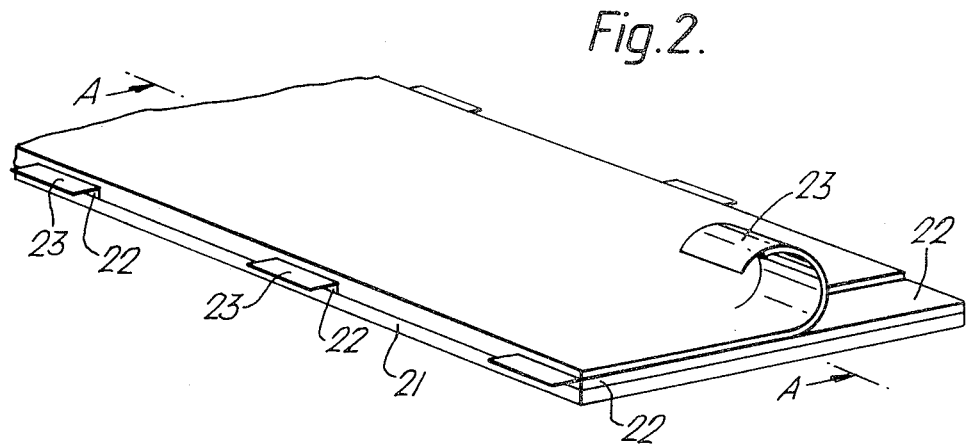
FIG. 2 is an isometric view of another device in the form of a continuous strip.
Figure 3:
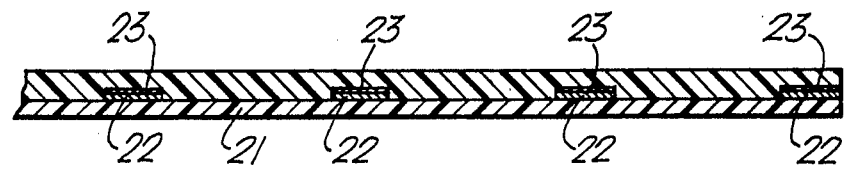
FIG. 3 is a section along the line A—A of FIG. 2 with the thickness of the device exaggerated.
Figure 4:
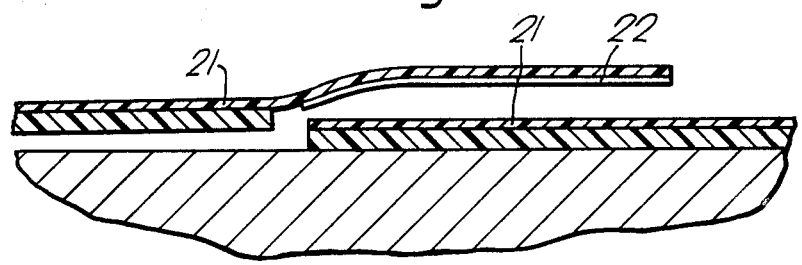
FIG. 4 is a section through part of the device shown in FIG. 2 showing one arrangement of the edge portions.

Referring to FIGS. 2 to 4, a sheet 21 having a thickness of about 2 mm and formed from a material comprising polyethylene is rendered dimensionally heat-recoverable in the same way as strip 1 of FIG. 1.

A number of transversely extending strips 22 of a latent-curing epoxy adhesive, pressure-sensitive or cross-linked hot-melt adhesive (the closure adhesive) are located on one surface of the sheet so that they are separated from each other by a constant distance, preferably by about 5 cm to 1 meter. Each strip 22 is covered by a strip 23 of release material preferably a thermoplastic polymer, and the entire surface, including the adhesive and strip of release material, is covered with a layer of sealant (either a mastic or non-cross-linked hot-melt adhesive) having a mastic or non-cross-linked hot-melt adhesive) having a thickness of from 0.5 to 2 mm. The strips 23 of release material are slightly longer than the strips 22 of adhesive so that they extend for a small distance beyond one or both longitudinally extending edges of the sheet 21 and so form tabs to allow the strips to be peeled off.

After the sealant has been applied, a layer of release paper (not shown) may, if the sealant is a mastic, be placed over the mastic to allow the sheet to be rolled up for storage.

In use, a length of the sheet is removed from the remainder of the sheet by cutting it along one side of a strip 22 of the adhesive so that a strip 22 extends along one transverse edge of the removed length. The release paper (if present) is removed and the length of sheet is then wrapped around the object to be enclosed so that the transverse edge with the strip 22 overlies, but is not in contact with, the opposite edge of the sheet. The overlying edge is pulled back and the strip of release material is peeled off, thereby removing the overlying area of sealant and exposing the strip 22 of adhesive. The transverse edge is then pressed onto the underlying edge as shown in FIG. 4 and the sheet can then be heated by means of a gas torch, initially in the overlapping region and then over its entire length to cause the sheet to recover. The strips 23 are so designed that any strips that remain on the device when it is installed will amalgamate with the adjacent sealant and/or closure adhesive so that no discernable boundary (which could provide a path for water ingress) remains.

Figure 5:
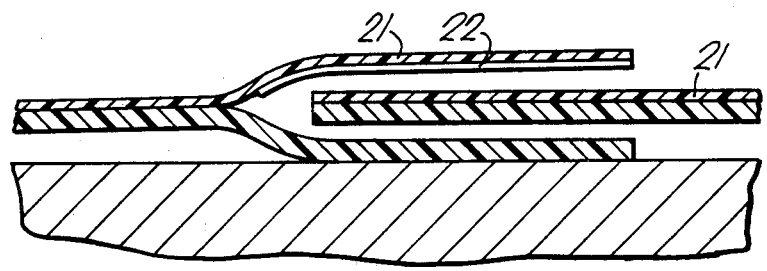
FIG. 5 is a section through part of the device shown in FIG. 2 showing another arrangement of the edge portions.

The device may alternatively be installed as shown in FIG. 5. In this case the length of the sheet is positioned above the substrate so that the transverse edge with the strip 22 lies on the substrate. The edge of the sheet is peeled away so that the closure adhesive strip 22 separates from the release layer 23 and the release layer 23 is peeled away from the sealant. The opposite edge portion is then inserted between the sheet and the sealant as shown in the figure, and the overlying edge portion is pressed against the underlying edge portion. The sheet may then be heated as described above to cause recovery.

This device has the advantage that the thickness of the sealant in the closure region (which is where the largest voids to be filled will occur) is twice the thickness of the sealant in the other regions of the cover. Thus the thickness of the sealant layer applied to the cover can be considerably reduced whilst retaining an adequate thickness of sealant in the closure region.

Figure 6:
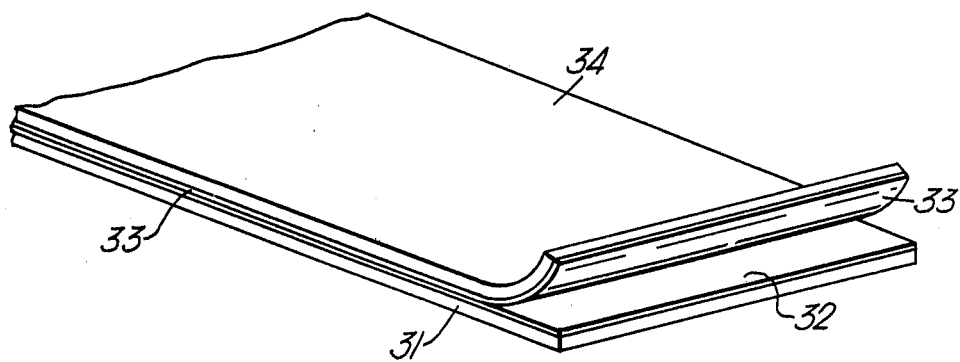
FIG. 6 is an isometric view of a third device in the form of a continuous strip.
Figure 7:
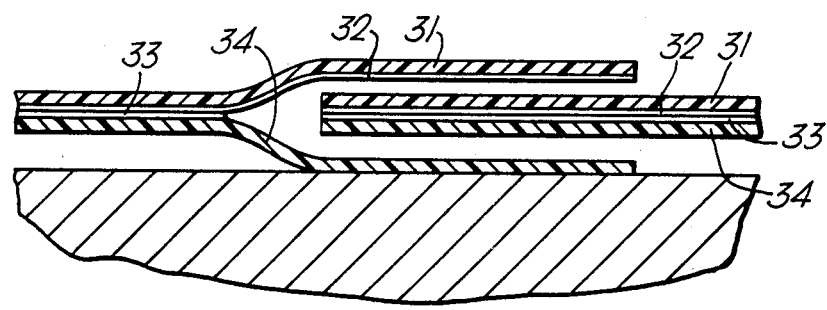
FIG. 7 is a schematic longitudinal section through part of the device of FIG. 6 during installation.

FIGS. 6 and 7 show a third form of device according to the invention which comprises a dimensionally heat-recoverable sheet 31 which has been formed in the same way as strip 1 of FIG. 1, and has then been coated with a layer 32 of a pressure-sensitive or curable adhesive. The layer of adhesive 32 is then coated with a polyethylene release layer 33 which is itself coated with a layer 34 of mastic. The device is advantageously formed as a continuous strip which is supplied in a roll. In order to install the device, a length of the device that is slightly larger than the circumference of the object to be enclosed is cut off the roll and placed about the object. The release layer 33 is peeled back from the adhesive layer 32 at one end for about ten centimeters and the two ends are positioned together as shown in FIG. 7 so that one edge portion of the device is sandwiched between the adhesive layer 32 and the mastic layer 34 optionally after having removed the edge portion of the release layer 33, or it may be installed in the manner shown in FIG. 3. The device can then be heated with a gas torch to recover the sheet 31 about the object.

The following Examples illustrate various devices according to the invention:

EXAMPLE 1

A hot-melt adhesive comprising 72.8% of an ethylene/ethyl acrylate copolymer containing about 20% of ethyl acrylate (DPD6181), 24.3% of a tackifier (Nevprene 9500), 1.9% of an antioxidant (Irganox 1010) and 1% of a radiation cross-linking promoter (triallyl isocyanurate) is pressed into 25 mm wide, 0.25 mm thick strips and irradiated with 6 MeV electrons to a dose of 10 Mrads.

The strips are positioned across a sheet of heat-shrinkable polyethylene having a stretch ratio of about 1.4:1 (Raychem WPC) and bonded thereto by briefly heating the surface of the adhesive to make it tacky, the spacing between the strips being about 63 cm (25 inches). A siliconised polyethylene release layer of 0.1 mm thickness is positioned over the adhesive and the sheet is then coated with a layer of Raychem S1052 mastic to a thickness of about 2 mm to form a cover as shown in FIG. 2. A portion of the sheet 62.2 in length is cut off so that a strip of the cross-linked hot-melt adhesive was located at one end, and the sheet is wrapped around a cylindrical metal substrate 17.8 cm in diameter. After having cleaned and degreased the opposite edge portion of the cover, the mastic overlying the cross-linked hot-melt adhesive is peeled away by means of the release layer and exposed adhesive is flame brushed with a gas torch to make it tacky. The edge portion with the adhesive is then pressed against the opposite edge portion to bond the two together.

The device is then heated with a gas torch beginning with the overlying edge portion until the cover has recovered and the mastic begins to flow from under the edges. It is observed that the edge portions remain together during recovery of the device.

EXAMPLE 2

Example 1 is repeated with the exception that the cross-linked hot-melt adhesive is replaced by a silicone based pressure-sensitive adhesive sold by General Electric under the type reference GE529. The adhesive is painted on the cover in 2.5 cm wide strips to a thickness of about 0.1 mm. After evaporation of solvent the adhesive containing parts of the cover is irradiated with 6 MeV electrons to a dose of 8 Mrads and thereafter completed as in Example 1.

The device can be recovered about a tubular substrate as in Example 1, and remains in place during recovery.

EXAMPLE 3

Example 2 is repeated using a solvent based nitrile contact adhesive (Roberts' Anchorweld B0308) instead of the pressure sensitive adhesive. The adhesive is painted on to the cover to a thickness of 0.05 mm and is also painted on to the outer surface of the cover in the region corresponding to the opposite edge portion so that, when the two edge portions are brought together, the areas of contact adhesive contact each other. Before bringing the areas of contact adhesive together, they are wiped with a cloth containing methylethyl ketone. The device can be wrapped around the substrate and recovered as in Example 1 without failure.

EXAMPLE 4

Example 1 is repeated with the exception that the hot-melt adhesive is replaced by a heat-curable adhesive comprising 40 parts of an elastomer (Vamac N123), 40 parts of a liquid epoxy resin (Epikote 828), 10 parts of a solid epoxy resin (Epikote 1004), 30 parts of azelaic dihydrazide and 10 parts of nickel imidazole sulphate. The heat-curable adhesive is pressed into a 0.25 mm thick strip and applied onto the cover. After manufacture, the device can be recovered satisfactorily about a substrate as described in Example 1.

We claim:

1. A device for enclosing at least part of an object, which comprises:
   a dimensionally heat-recoverable cover;
   adhesive means coated on at least part of the cover for retaining the cover in position during heat recovery of the cover;
   sealant means covering the adhesive means for preventing the adhesive means from adhering to the article and at least a portion of the sealant means being separable from the adhesive means; and
   whereby upon separation of the sealant means, the adhesive means may adhere to the object with the cover enclosing at least part of the object.

2. A device as claimed in claim 1, wherein the sealant means is peelably separable from the cover.

3. A device as claimed in claim 1, wherein a release material is located between the sealant means and adhesive means to facilitate removal of the sealant means.

4. A device as claimed in claim 3, wherein the release material is in the form of a release layer.

5. A device as claimed in claim 4, wherein the release layer is formed from a thermoplastic polymer that will melt at or below the recovery temperature of the cover.

6. A device as claimed in claim 1, wherein the sealant means is a hot-melt adhesive that will melt at or below the recovery temperature of the cover.

7. A device as claimed in claim 6, wherein the sealant means has lines of weakness to allow one or more portions thereof to be separated from the remainder thereof when the portion or portions are removed.

8. A device as claimed in claim 1, wherein the sealant means covers one entire surface of the cover.

9. A device as claimed in claim 1, wherein the sealant means is a mastic.

10. A device as claimed in claim 1, wherein the sealant means is a mastic and a release layer is located between the adhesive means and the sealant means to facilitate removal of the sealant means.

11. A device as claimed in claim 1, wherein the cover is in the form of a continuous sheet.

12. A device as claimed in claim 11, wherein the adhesive means covers one entire surface of the sheet.

13. A device as claimed in claim 11, wherein the adhesive means is in the form of a number of strips that extend across the sheet and are spaced apart from each other along the length of the sheet.

14. A device as claimed in claim 1, wherein the adhesive means is a pressure-sensitive adhesive.

15. A device as claimed in claim 1, wherein the adhesive means is a cross-linked hot-melt adhesive.

16. A device as claimed in claim 1, wherein the adhesive means is a heat-curable adhesive.

17. A device as claimed in claim 1, wherein the adhesive means is a contact adhesive and the opposite side of the cover has corresponding areas of contact adhesive.

18. A method of enclosing at least part of an object by means of a device as set forth in claim 1, which comprises the steps of:
   (a) positioning the cover about the object so that one portion of the cover can overlie another part thereof;
   (b) peeling a portion of the sealant means from the said portion of the adhesive means to allow the adhesive means to adhere to a surface of the object;
   (c) causing the said portion to overlie the other part of the cover so that the portion is bonded thereby by the adhesive means; and
   (d) heating the cover to cause recovery thereof.

19. A method as claimed in claim 18, wherein the cover is initially in the form of a continuous sheet and a length thereof to be positioned about the object is separated from the continuous sheet prior to step (a).

20. A method as claimed in claim 19, wherein the said portion of the sealant means covers the adhesive means and is peeled away in step (b) to expose the adhesive means.

21. A device as claimed in claim 1 wherein the sealant means is at least partially overlying the adhesive means.

22. A device as claimed in claim 21, wherein the interface between the adhesive means and the sealant means has a peel strength of not more than 5 N/25 mm.

* * * * *